United States Patent
Aokage

(10) Patent No.: US 9,445,009 B2
(45) Date of Patent: Sep. 13, 2016

(54) IMAGE PROCESSING APPARATUS CAPABLE OF GENERATING COMPOSITE VIDEO IMAGE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Hironori Aokage, Yashio (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/671,662

(22) Filed: Mar. 27, 2015

(65) Prior Publication Data

US 2015/0281545 A1 Oct. 1, 2015

(30) Foreign Application Priority Data

Mar. 31, 2014 (JP) .................. 2014-072494
Mar. 19, 2015 (JP) .................. 2015-056051

(51) Int. Cl.
*H04N 5/235* (2006.01)
*G06T 5/00* (2006.01)
*G06T 5/50* (2006.01)

(52) U.S. Cl.
CPC ............. *H04N 5/2355* (2013.01); *G06T 5/007* (2013.01); *G06T 5/009* (2013.01); *G06T 5/50* (2013.01); *H04N 5/2353* (2013.01); *G06T 2207/10016* (2013.01); *G06T 2207/10144* (2013.01); *G06T 2207/10152* (2013.01); *G06T 2207/20208* (2013.01)

(58) Field of Classification Search
CPC ........... H04N 5/2355; H04N 5/35545; H04N 5/35581; G06T 5/007–5/009; G06T 2207/20208
See application file for complete search history.

(56) References Cited

U.S. PATENT DOCUMENTS

2014/0212065 A1* 7/2014 Hirai .................. H04N 5/23235
382/284

FOREIGN PATENT DOCUMENTS

JP 2009-232382 A 10/2009
WO 2010/116731 A1 10/2010

* cited by examiner

*Primary Examiner* — Paul Berardesca
(74) *Attorney, Agent, or Firm* — Cowan, Liebowitz & Latman, P.C.

(57) ABSTRACT

An image processing apparatus capable of obtaining a sufficient HDR effect while keeping smoothness of an appearance of a video image in an HDR composition process. A first computation unit finds a first composition ratio of frames of images that are continuously taken at mutually different exposures based on luminance of at least one of the frames of images. A second computation unit finds a second composition ratio of the frames of images based on the luminance difference between the frames of images. A third computation unit finds a third composition ratio as a final composition ratio for compositing the frames of images based on the first composition ratio, the second composition ratio, and shutter speed at a time of taking the frames of images. A composition unit generates one frame of an image by compositing the frames of images based on the third composition ratio.

12 Claims, 12 Drawing Sheets

IMAGE PROCESSING APPARATUS CAPABLE OF GENERATING COMPOSITE VIDEO IMAGE, CONTROL METHOD THEREFOR, AND STORAGE MEDIUM STORING CONTROL PROGRAM THEREFOR

BACKGROUND OF THE INVENTION

1. Field of the Invention

The present invention relates to image processing apparatuses, a control method therefor, and a storage medium storing a control program therefor, and in particular, relates to an image processing apparatus that is capable of generating a video image by compositing a plurality of frames of images with high dynamic range (HDR) composition.

2. Description of the Related Art

There is an image pickup apparatus, such as a digital camera or a digital video camera, as one of image processing apparatuses. Some of image pickup apparatuses perform a composition process that obtains a high dynamic range (HDR) image by compositing a plurality of frames of images that are taken under mutually different exposure amounts (hereinafter referred to as an HDR composition process). In the HDR composition process, an image that does not include what is called halation and black collapse is obtained by compositing images with a proper exposure.

Incidentally, in the HDR composition process, a HDR image is obtained also in a video image by repeating a process that composites a plurality of taken frames into one frame according to the time series. However, a frame rate of a video image obtained by the HDR composition process becomes lower than a frame rate of an image pickup. Accordingly, in particular, when shutter speed is fast, a motion of a moving subject may not look smooth.

Furthermore, in the case of a video image, a moving subject is generally replaced with pixels in one of a plurality of frames according to the characteristics in the HDR composition process. Accordingly, when accuracy of moving-subject detection is insufficient, a user may feel strange about the composite image, because portions of the moving subject are replaced with pixels of the different frames.

In order to solve such a problem, in an HDR composition process for a video image, there is a known technique that takes two images of which exposures are different by means of long-time exposure and short-time exposure, generates an estimated image by adding a blur effect to the long-time exposed image, generates a differential image by computing a difference between the long-time exposed image and the estimated image, and encodes the short-time exposed image and the differential image, for example (see WO2010/116731). This increases encoding efficiency rather than a case where a short-time exposed image and a long-time exposed image are encoded.

Moreover, there is a technique that generates an intermediate image based on information about motions in preceding and succeeding frames in order to compensate image information in no-exposure period during one frame period of video image (see Japanese Laid-Open Patent Publication (Kokai) No. 2009-232382 (JP 2009-232382A)). In this publication, when one image is generated by compositing an original image and an intermediate image, composition weighting coefficients of the original image and the intermediate image are computed according to shutter speed.

As mentioned above, in WO2010/116731, although a difference between two frames is compensated to try to increase encoding efficiency (i.e., although the difference between frames is reduced to try to increase the encoding efficiency), it is difficult to display a video image smoothly in the HDR composition process.

Moreover, in Japanese Laid-Open Patent Publication (Kokai) No. 2009-232382 (JP 2009-232382A), since composition weighting coefficients of the original image and the intermediate image are computed according to shutter speed when one image is generated by compositing the original image and the intermediate image, the smoothness of the appearance of the video image is improved. However, the HDR effect owing to the HDR composition process is reduced.

That is, the methods described in the above-mentioned two publications are difficult to obtain a sufficient HDR effect while keeping smoothness of an appearance of a video image.

SUMMARY OF THE INVENTION

The present invention provides an image processing apparatus, a control method therefor, and a storage medium storing a control program therefor that are capable of obtaining a sufficient HDR effect while keeping smoothness of an appearance of a video image in an HDR composition process.

Accordingly, a first aspect of the present invention provides an image processing apparatus including a first computation unit configured to find a first composition ratio of a plurality of frames of images that are continuously taken at mutually different exposures based on luminance of at least one of the plurality of frames of images, a second computation unit configured to find a second composition ratio of the plurality of frames of images based on the luminance difference between the plurality of frames of images, a third computation unit configured to find a third composition ratio as a final composition ratio for compositing the plurality of frames of images based on the first composition ratio, the second composition ratio, and shutter speed at a time of taking the plurality of frames of images, and a composition unit configured to generate one frame of an image by compositing the plurality of frames of images based on the third composition ratio.

Accordingly, a second aspect of the present invention provides a control method for an image processing apparatus including a first computation step of finding a first composition ratio of a plurality of frames of images that are continuously taken at mutually different exposures based on luminance of at least one of the plurality of frames of images, a second computation step of finding a second composition ratio of the plurality of frames of images based on the luminance difference between the plurality of frames of images, a third computation step of finding a third composition ratio as a final composition ratio for compositing the plurality of frames of images based on the first composition ratio, the second composition ratio, and shutter speed at a time of taking the plurality of frames of images, and a composition step of generating one frame of an image by compositing the plurality of frames of images based on the third composition ratio.

Accordingly, a third aspect of the present invention provides a non-transitory computer-readable storage medium storing a control program causing a computer to execute the control method of the second aspect.

According to the present invention, the third composition ratio at the time of compositing a plurality of frames of images is computed on the basis of the first composition ratio, the second composition ratio, and the shutter speed at the time of obtaining the plurality of frames of images, and one frame of image is generated by compositing the plurality of frames of images on the basis of the third composition ratio. Accordingly, a sufficient HDR effect is obtained while keeping smoothness of an appearance of a video image in the HDR composition process.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
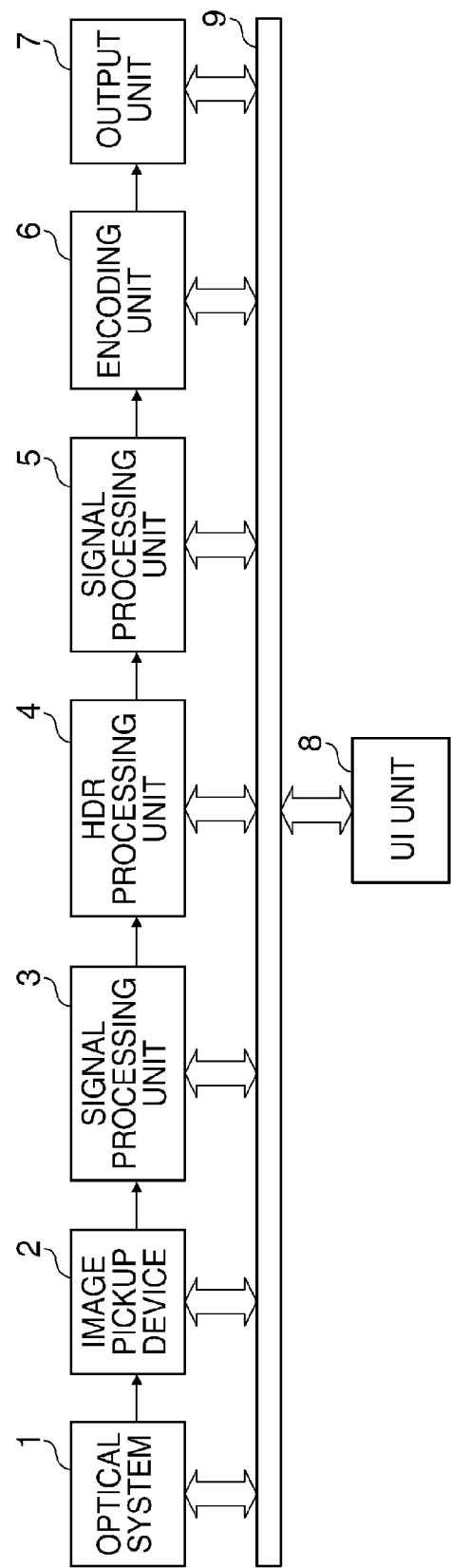
FIG. 1 is a block diagram schematically showing a configuration of an image processing apparatus according to a first embodiment of the present invention.

FIG. 1 is a block diagram schematically showing a configuration of an image processing apparatus according to a first embodiment of the present invention.

The illustrated image processing apparatus is an image pickup apparatus, such a digital camera (hereinafter referred to as a camera), which is able to take a video image. The camera obtains two frames at the time of taking a video image by taking one frame (hereinafter referred to as a proper frame) with a proper exposure and taking one frame (hereinafter referred to as an under frame) in an underexposure state. In the description, the exposure means an index corresponding to brightness of an image that is determined by an exposure amount depending on shutter speed and an aperture value, and by a gain like ISO speed multiplied to an image signal. The difference in exposure is caused by changing at least one of the various conditions that define brightness of an image. Then, the camera performs a process about a moving subject using these two frames, and performs a composition process (hereinafter referred to as an HDR composition process) in which images of the two frames are composited to obtain a high dynamic range (HDR) image. In the HDR composition process, the camera controls a composition degree of a moving subject according to shutter speed.

The camera is provided with an optical system 1, an image pickup device 2, a signal processing unit 3, an HDR processing unit 4, a signal processing unit 5, an encoding unit 6, an output unit 7, and a UI (user interface) unit 8, which are mutually connected through a bus 9.

Figure 2:
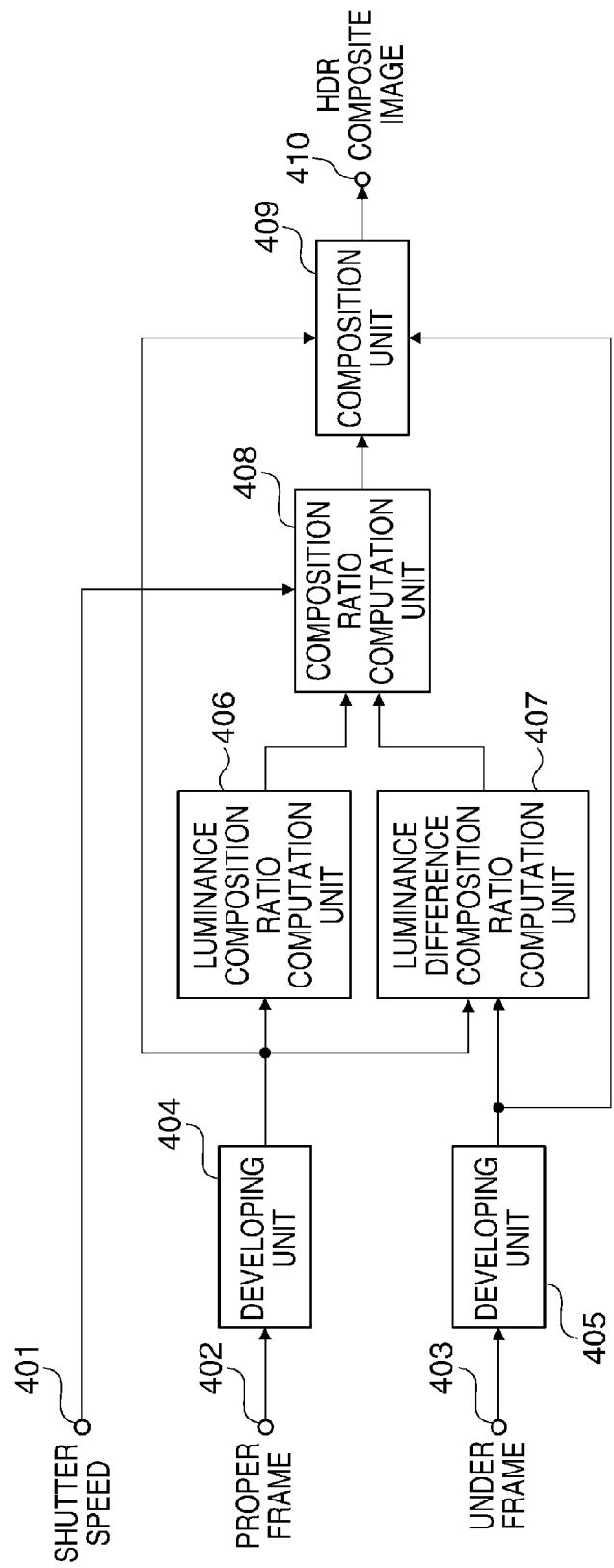
FIG. 2 is a block diagram schematically showing a configuration of an HDR processing unit shown in FIG. 1.

FIG. 2 is a block diagram schematically showing a configuration of the HDR processing unit 4 shown in FIG. 1.

The illustrated HDR processing unit 4 has a shutter speed input terminal 401, a proper-frame input terminal 402, an under-frame input terminal 403, developing units 404 and 405, a luminance composition ratio computation unit 406, and a luminance difference composition ratio computation unit 407, a composition ratio computation unit 408, a composition unit 409, and an HDR composite image output terminal 410.

The optical system 1 has an aperture stop, lenses, etc. Lights passing through the optical system 1 form an image on the image pickup device 2. The image pickup device 2 is a CMOS or a CCD sensor, for example, converts an optical image photoelectrically, and outputs electrical signals (analog signals). It should be noted that the image pickup device 2 has a plurality of pixels that are arranged in the Bayer arrangement in a two-dimensional matrix form.

The analog signals that the image pickup device 2 outputs are sent to the signal processing unit 3. The signal processing unit 3 applies A/D conversion, gain control, etc. to the analog signals, and sends digital image signals (a proper-frame image signal and an under-frame image signal) to the HDR processing unit 4.

It should be noted that a user selects a video image mode or a still image mode, and sets photographing conditions, such as ISO speed and shutter speed, through the UI module 8. Then, setup information about the photographing conditions set through the UI module 8 is sent to the optical system 1, the image pickup device 2, the image processing unit 3, the HDR processing unit 4, the signal processing unit 5, the encoding unit 6, and the output unit 7 via the bus 9.

The proper-frame image signal and the under-frame image signal are input into the HDR processing unit 4 through the input terminals 402 and 403 from the signal processing unit 3. Then, the proper-frame image signal and the under-frame image signal are respectively sent to the developing units 404 and 405. Furthermore, the shutter speed is given to the HDR processing unit 4 from the UI module 8 via the bus 9, as mentioned above. Then, the shutter speed is sent to the composition ratio computation unit 408.

The developing unit 404 sends proper-frame image data, which is obtained by developing the proper-frame image signal, to the composition unit 409, the luminance composition ratio computation unit 406, and the luminance difference composition ratio computation unit 407. On the other hand, the developing unit 405 sends under-frame image data, which is obtained by developing the under-frame image signal, to the composition unit 409 and the luminance difference composition ratio computation unit 407.

The luminance composition ratio computation unit 406 computes a luminance composition ratio (a first composition ratio) for every pre-divided area in an image or for every pixel according to luminance of an area or a pixel with reference to the proper-frame image data. Then, the luminance composition ratio computation unit 406 sends the luminance composition ratio concerned to the composition ratio computation unit 408. The luminance difference composition ratio computation unit 407 computes a luminance difference composition ratio (a second composition ratio) for every pre-divided area in an image or for every pixel according to luminance difference of an area or a pixel with reference to the proper-frame image data and the under-frame image data. Then, the luminance difference composition ratio computation unit 407 sends the luminance difference composition ratio to the composition ratio computation unit 408.

The composition ratio computation unit 408 computes a final composition ratio (a third composition ratio) on the basis of the luminance composition ratio, the luminance difference composition ratio, and the shutter speed, and sends the composition ratio concerned to the composition unit 409. The composition unit 409 composites the proper-frame image data and the under-frame image data according to the final composition ratio, and outputs the composited data as HDR composite image data to the signal processing unit 5 through the HDR composite image output terminal 410.

The signal processing unit 5 applies signal processes, such as luminance gain adjustment and a resizing process, to the HDR composite image data, and sends the processed image data, which is a result of the signal processes, to the encoding unit 6. The encoding unit 6 applies an encoding process to the processed image data, and outputs encoded image data to the output unit 7. Then, the output unit 7 outputs the encoded image data to an interface (not shown), such as the HDMI (registered trademark), saves the data to a media, such as a CF card, and outputs the data to a display device (not shown), such as a back-side LCD.

The HDR composition process in the above-mentioned HDR processing unit 4 will be further described hereinafter. A proper-frame image signal is input to the input terminal 402 from the signal processing unit 3 by the unit of frames. Similarly, an under-frame image signal is input to the input terminal 403 from the signal processing unit 3 by the unit of frames.

Figure 3:
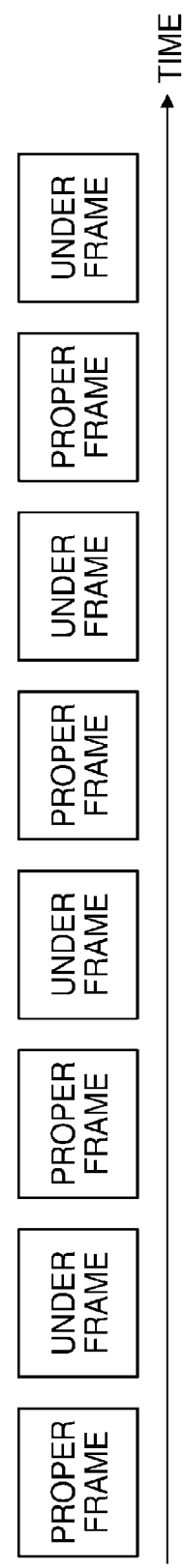
FIG. 3 is a view showing an example of a flow of image signals in the unit of frames that are input into the HDR processing unit shown in FIG. 2.

FIG. 3 is a view showing an example of a flow of image signals in the unit of frames that are input into the HDR processing unit 4 shown in FIG. 2.

The camera takes images at a proper exposure and an under exposure alternately. Proper-frame image signals (proper frames) are sequentially input to the HDR processing unit 4 via the input terminal 402. On the other hand, under-frame image signals (under frames) are sequentially input to the HDR processing unit 4 via the input terminal 403.

The exposure difference between the proper exposure and the underexposure is two steps of difference in ISO speed. And a proper frame and an under frame are taken in this order in the embodiment. However, the exposure difference and the order of taking are not limited to the above mentioned settings. Furthermore, a proper frame and an under frame are alternately input to the HDR processing unit 4, and two frames constitute one unit as illustrated. However, the present invention is not limited to the illustrated method.

As mentioned above, the developing units 404 and 405 respectively perform the development processes for a proper-frame image signal and an under-frame image signal.

Figure 4:
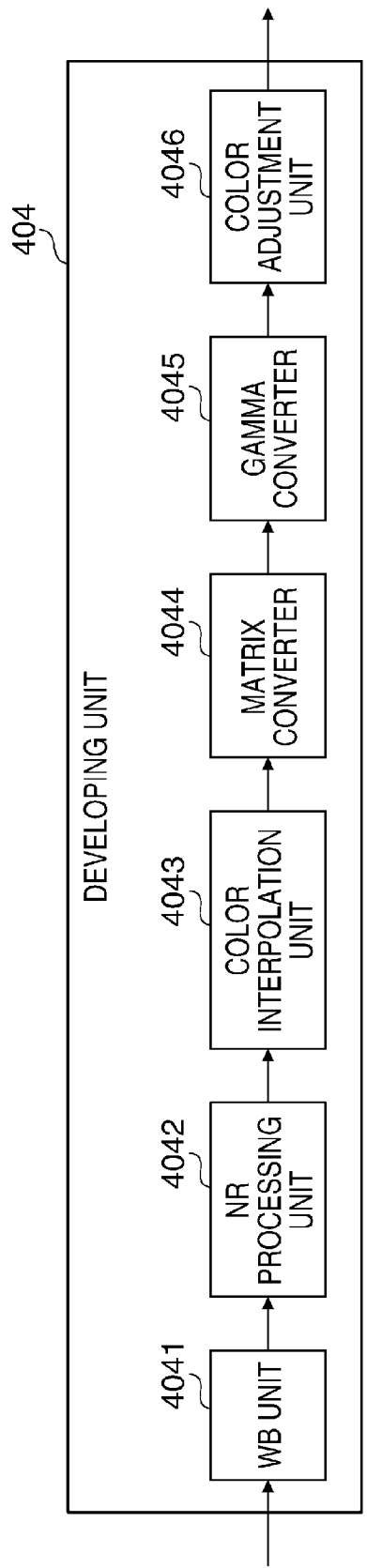
FIG. 4 is a block diagram schematically showing a configuration of a developing unit shown in FIG. 1.

FIG. 4 is a block diagram schematically showing a configuration of the developing unit 404 shown in FIG. 1. Since the configurations of the developing units 404 and 405 are identical, only the developing unit 404 is described.

In the developing unit 404, a white balancing (WB) unit 4041 applies a WB process to a proper-frame image signal. Specifically, the WB unit 4041 multiplies R (red), G (green), and B (blue) by a gain so that R, G, and B become the same signal value in an area that should be white. Then, a noise reduction (NR) processing unit 4042 reduces noise owing to the sensor in the image signal after the WB process.

A color interpolation unit 4043 interpolates a color mosaic image, and generates a color image in which color information about R, G, and B is defined for every pixel. The matrix converter 4044 applies a matrix conversion process to the color image concerned. A gamma converter 4045 applies a gamma conversion process to the output of the matrix converter 4044 to generate a basic color image. A color adjustment unit 4046 applies a process for improving appearance of an image to the basic color image. For example, the color adjustment unit 4046 performs image corrections, such as saturation emphasis, hue correction, and edge emphasis, to the basic color image, and outputs a proper-frame image data.

It should be noted that the developing unit 405 also has the configuration shown in FIG. 4, applies the development process to an under-frame image signal, and outputs under-frame image data.

Incidentally, since image signals taken at mutually different exposures are used in the HDR composition process, it is necessary to multiply a gain beforehand to make luminance levels uniform. In this case, it is necessary to set the gain so that what is called halation and black collapse may not arise.

Figure 5:
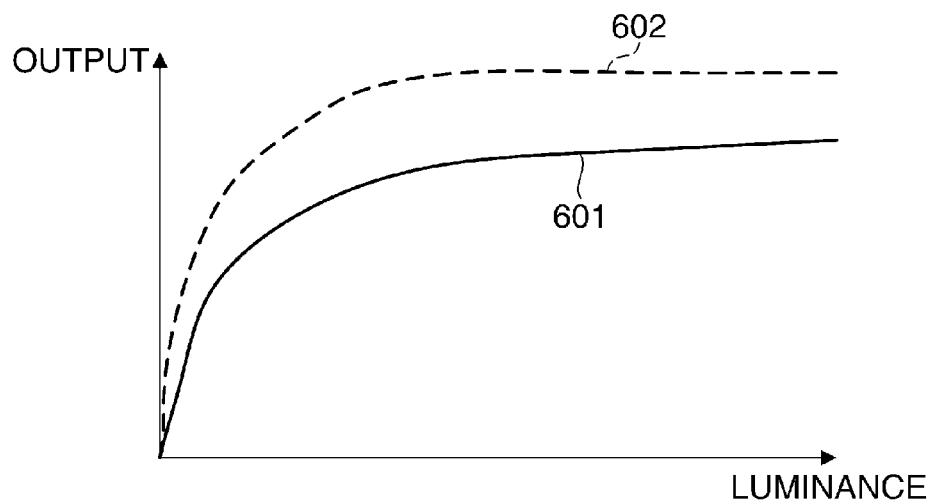
FIG. 5 is a graph showing a gamma characteristic used by a gamma converter shown in FIG. 4.

FIG. 5 is a view showing a gamma characteristic used by the gamma converter 404s shown in FIG. 4.

A gamma characteristic 601 indicated by a solid line in FIG. 5 is used for a proper-frame image signal in the developing unit 404. Moreover, a gamma characteristic 602 indicated by a broken line is used for an under-frame image signal in the developing unit 405.

As shown in FIG. 5, the gamma characteristic 602 has a larger output to luminance than the gamma characteristic 601. Accordingly, since a larger gain is multiplied to an under-frame image signal rather than to a proper-frame image signal, noise also becomes large in under-frame image data after development. Accordingly, the NR processing unit applies a stronger NR process to an under-frame image signal rather than to a proper-frame image signal so as to make noise amounts of proper-frame image data and under-frame image data uniform after development.

This process reduces strange feeling owing to difference between the noise amount of the proper-frame image signal and the noise amount of the under-frame image signal after the HDR composition process. In the NR process, a smoothing process in predetermined kernel size is used, for example. Alternatively, a filtering process using a filter, such as ϵ-filter or an edge preserving bilateral filter, may be used. Anyway, the NR process is executed in consideration of a balance between processing speed of the image processing apparatus and resources, such as a memory.

Although the developing units 404 and 405 are separated in the above description, a single developing unit can process a proper-frame image signal and an under-frame image signal by switching the parameters, such as the gamma characteristic, in response to the kind of the input signal (a proper-frame image signal or an under-frame image signal).

As mentioned above, the luminance composition ratio computation unit 406 computes a luminance composition ratio for every pre-divided area in an image or for every pixel according to luminance of an area or a pixel of proper-frame image data.

Figure 6:
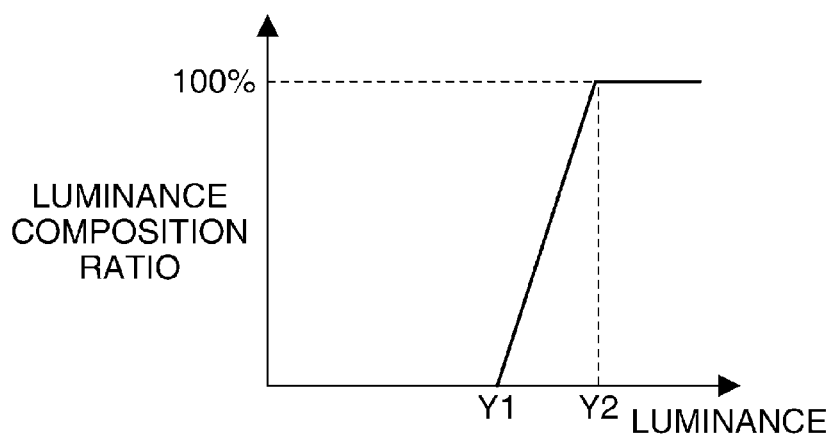
FIG. 6 is a graph showing a relationship between a luminance composition ratio of under-frame image data that is computed by a luminance composition ratio computation unit shown in FIG. 2 and luminance.

FIG. 6 is a graph showing a relationship between a luminance composition ratio k of under-frame image data that is computed by the luminance composition ratio computation unit 406 shown in FIG. 2 and luminance.

In order to obtain HDR composite image data, the luminance composition ratio of the proper-frame image data becomes 100% in an area darker than a first luminance composition threshold Y1 in the proper-frame image data, and the luminance composition ratio k of the under-frame image data becomes 100% in an area brighter than a second luminance composition threshold Y2 that is larger than the first luminance composition threshold Y1. That is, when the luminance of the proper-frame image data (proper-flame luminance) is smaller than the first luminance composition threshold Y1, the luminance composition ratio k of the under-frame image data becomes 0%.

Then, when the proper-flame luminance is above the first luminance composition threshold Y1 and is below the second luminance composition threshold Y2, the luminance composition ratio computation unit 406 monotonically increases (i.e., linearly increases) the luminance composition ratio k of the under-frame image data from 0% to 100% to smooth the changeover between the images.

The luminance difference composition ratio computation unit 407 computes a luminance difference composition ratio according to the luminance difference between the under-frame image data and the proper-frame image data as mentioned above.

Figure 7:
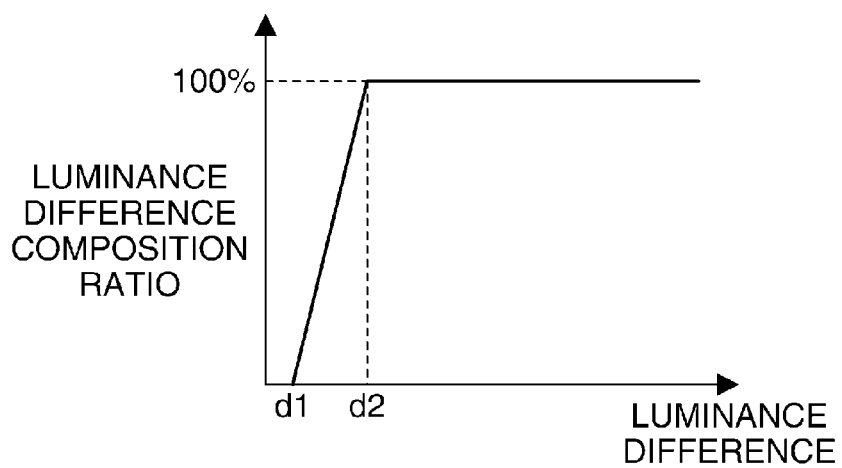
FIG. 7 is a graph showing a relationship between a luminance difference composition ratio of under-frame image data that is computed by a luminance difference composition ratio computation unit shown in FIG. 2 and luminance difference.

FIG. 7 is a graph showing a relationship between a luminance difference composition ratio d of under-frame image data that is computed by the luminance difference composition ratio computation unit 407 shown in FIG. 2 and the luminance difference.

When an HDR composite image data is generated, there is a need for compositing a plurality of frames of which photographing times differ. Accordingly, when a moving subject exists in frames, the positions of the moving subject differ among a plurality of frames. Moreover, the luminance difference between the under-frame image data and the proper-frame image data becomes large in an area in which a moving subject exists.

The luminance difference composition ratio computation unit 407 finds the luminance difference between the under-frame image data and the proper-frame image data for every pre-divided area in an image or for every pixel. Then, the luminance difference composition ratio computation unit 407 computes a luminance difference composition ratio on the basis of the luminance difference concerned.

There are many cases where gradation remains in under-frame image data in comparison with in proper-frame image data. Accordingly, the luminance difference composition ratio computation unit 407 uses the under-frame image data in an area corresponding to a moving subject. In this case, when the luminance difference is smaller than a first luminance difference composition threshold d1, the luminance difference composition ratio of the proper-frame image data becomes 100%. On the other hand, when the luminance difference is larger than a second luminance difference composition threshold d2 that is larger than the first luminance difference composition threshold d1, the luminance difference composition ratio d of the under-frame image data becomes 100%.

That is, the luminance difference composition ratio d of the under-frame image data becomes 0% when the luminance difference is smaller than the first luminance difference composition threshold d1. Then, when the luminance difference is above the first luminance difference composition threshold d1 and is below the second luminance difference composition threshold d2, the luminance difference composition ratio computation unit 407 monotonically increases (i.e., linearly increases) the luminance difference composition ratio d of the under-frame image data from 0% to 100% to smooth the changeover between the images.

A frame rate of a composited video image becomes lower than a frame rate at the time of taking an image, in general. In particular, when shutter speed is fast, a motion of a moving subject does not look smooth. Accordingly, the composition ratio computation unit 408 controls the composition degree in a moving subject according to shutter speed to obtain smoothness of a video image.

Figure 8A:
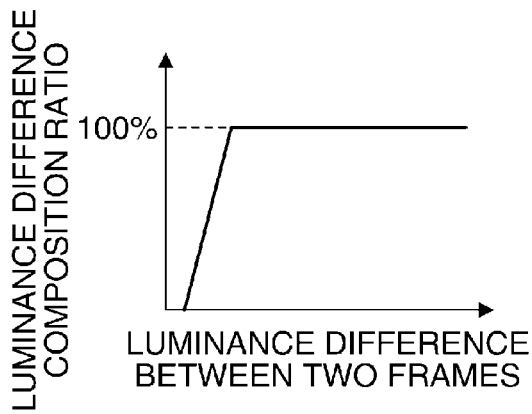
FIG. 8A is a graph showing a relationship between a luminance difference composition ratio of under-frame image data that is computed by the luminance difference composition ratio computation unit shown in FIG. 2 and luminance difference between two frames.
Figure 8B:
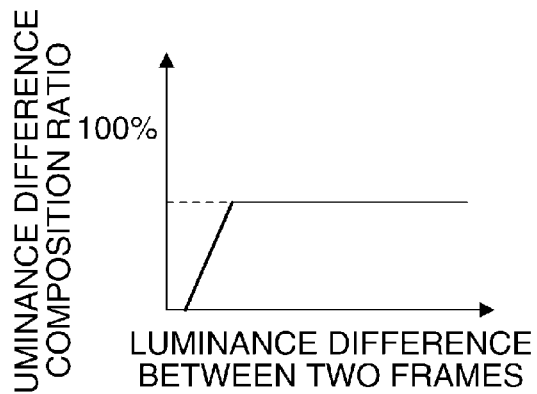
FIG. 8B is a graph showing a relationship between a luminance difference composition ratio of under-frame image data and luminance difference between two frames after a composition ratio computation unit shown in FIG. 2 changes a composition degree.

FIG. 8A and FIG. 8B are graphs for describing the control of the composition degree performed by the composition ratio computation unit 408 shown in FIG. 2. FIG. 8A is a graph showing a relationship between the luminance difference composition ratio d of the under-frame image data that is computed by the luminance difference composition ratio computation unit 407 shown in FIG. 2 and luminance difference between two frames. FIG. 8B is a graph showing a relationship between the luminance difference composition ratio of the under-frame image data and luminance difference between two frames after the composition ratio computation unit 408 changes the composition degree.

Here, the composition ratio computation unit 408 changes the relationship between the luminance difference composition ratio and the luminance difference shown in FIG. 8A into the relationship shown in FIG. 8B by setting the highest composition ratio to 50%, for example. As a result of this, two frames are composited under the condition where the luminance difference composition ratio of the proper-frame image data is 50% and the luminance difference composition ratio d of the under-frame image data is 50%, in an area of a moving subject with large luminance difference.

The luminance difference composition ratio of the under-frame image data shown in FIG. 8A shall be d, and the luminance difference composition ratio of the under-frame image data after determining the composition degree (i.e., after changing the luminance difference composition ratio) shall be $d_{after}$. In this case, the changed luminance difference composition ratio $d_{after}$ is found by the following formula (1).

$$d_{after} = d \cdot (G/100) \quad (1)$$

Figure 9:
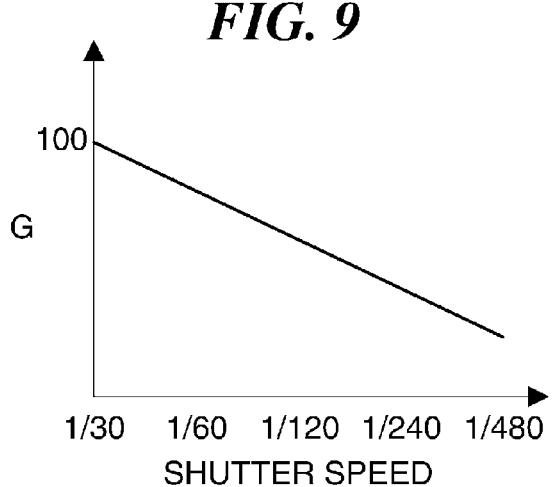
FIG. 9 is a graph showing a relationship between a variable G used by the composition ratio computation unit to compute a luminance difference composition ratio of under-frame image data and shutter speed during the HDR composition process for a video image.

FIG. 9 is a graph showing a relationship between a variable G used by the composition ratio computation unit 408 to compute the luminance difference composition ratio $d_{after}$ of the under-frame image data and the shutter speed during the HDR composition process for a video image.

As shown in FIG. 9, the variable G included in the formula (1) varies in response to change of the shutter speed. In this case, the variable G increases as the shutter speed becomes slower, and the variable G decreases as the shutter speed becomes faster. That is, when the shutter speed is slow, the changed luminance difference composition ratio $d_{after}$ of the under-frame image data becomes large, and when the shutter speed is fast, the changed luminance difference composition ratio $d_{after}$ of the under-frame image data becomes small. The composition ratio computation unit 408 compares the changed luminance difference composition ratio $d_{after}$ with the luminance composition ratio k of the under-frame image data for every pre-divided area in an image or for every pixel, and outputs the larger ratio as a final composition ratio m to the composition unit 409.

The composition unit 409 composites the proper-frame image data and the under-frame image data according to the composition ratio m using the following formula (2), and generates HDR composite image data.

$$p = pt \cdot \left(\frac{100-m}{100}\right) + pu \cdot \left(\frac{m}{100}\right) \quad (2)$$

Wherein p, pt, and pu respectively represent a pixel value in a final composite frame, a pixel value in a proper frame, and a pixel value in an under frame.

Although the HDR composition process for a video image is described above, the HDR composition process may be applied to a still image similarly. Since a moving subject is distinctly taken in a still image when shutter speed is fast, it is necessary not to perform the composition process as much as possible in such a case.

Figure 10:
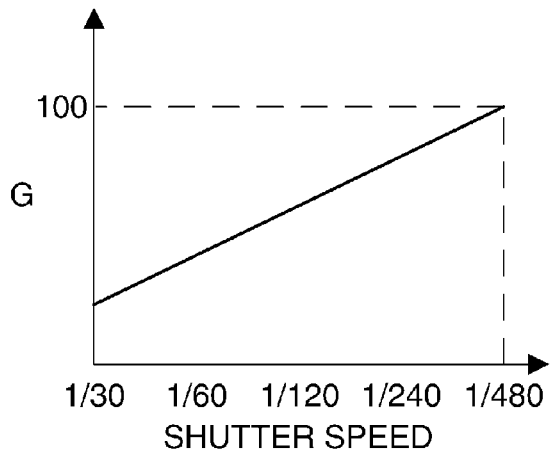
FIG. 10 is a graph showing a relationship between the variable G used by the composition ratio computation unit to compute a luminance difference composition ratio of under-frame image data and shutter speed during the HDR composition process for a still image.

FIG. 10 is a graph showing a relationship between the variable G used by the composition ratio computation unit 408 to compute the changed luminance difference composition ratio $d_{after}$ of the under-frame image data and the shutter speed during the HDR composition process for a still image.

In a case shown in FIG. 10, the variable G decreases as the shutter speed becomes slower, and the variable G increases as the shutter speed becomes faster. That is, the changed luminance difference composition ratio $d_{after}$ of the under-frame image data becomes small when the shutter speed is slow, and the changed luminance difference composition ratio $d_{after}$ of the under frame image data becomes large when the shutter speed is fast.

As mentioned above, since a proper frame and an under frame are composited in an area of a moving subject during the HDR composition process for image data, a sufficient HDR effect is obtained while keeping smoothness of an appearance of an image, especially a video image, in the first embodiment of the present invention. That is, since the HDR composition process is performed while changing the composition ratio according to the shutter speed, the optimal HDR composite video image data is obtained. This reduces awkwardness of a motion owing to the reduction of the frame rate, and reduces image quality deterioration of a moving subject.

Furthermore, since the composition degree is controlled according to the shutter speed, the load of the composition process is reduced in an area that does not need composition.

Next, a camera as an example of an image processing apparatus according to a second embodiment of the present invention will be described. It should be noted that the configuration of the camera of the second embodiment is the same as the camera shown in FIG. 1.

The camera according to the second embodiment picks up temporally continuous three frames including a proper frame, an under frame, and a proper frame. The camera controls the number of frames to be composited in an area of a moving subject and composition degree according to shutter speed when the HDR composition process is performed.

Figure 11:
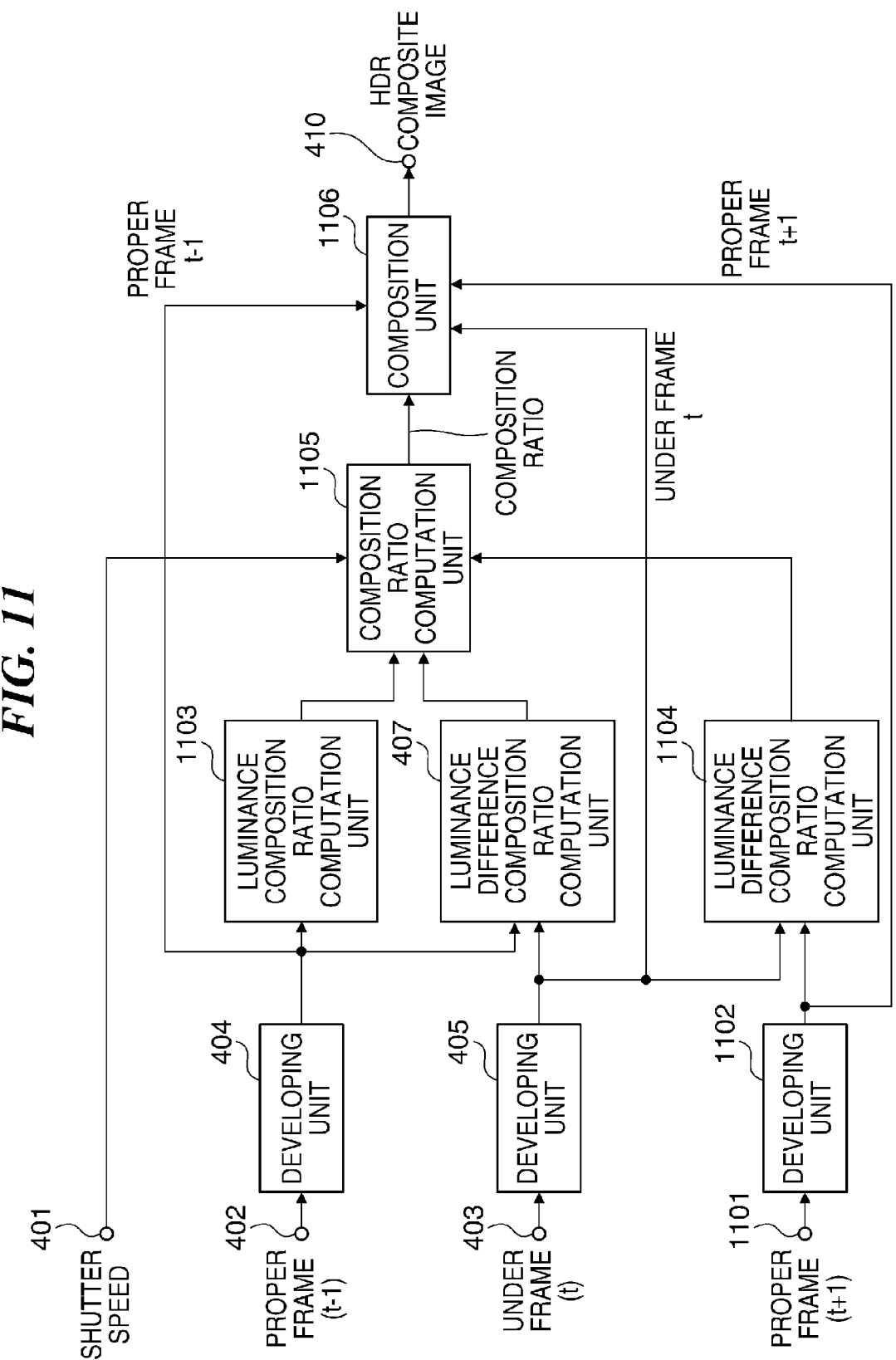
FIG. 11 is a block diagram schematically showing a configuration of an HDR processing unit in a camera according to a second embodiment of the present invention.

FIG. 11 is a block diagram schematically showing a configuration of an HDR processing unit 4 disposed in the camera according to the second embodiment of the present invention. It should be noted that components of the HDR processing unit 4 shown in FIG. 11 that are identical to the components of the HDR processing unit shown in FIG. 2 are indicated by the same reference numerals.

The HDR processing unit 4 shown in FIG. 11 is provided with the shutter speed input terminal 401, a first proper frame input terminal 402, the under-frame input terminal 403, and a second proper-frame input terminal 1101.

A proper-frame image signal (hereinafter referred to as a first proper-frame image signal) picked up at time (t−1) is input to the first proper frame input terminal 402 from the signal processing unit 3. An under-frame image signal picked up at time t is input to the under-frame input terminal 403. Moreover, a proper-frame image signal (hereinafter referred to as a second proper-frame image signal) picked up at time (t+1) is input to the second proper-frame input terminal 1101. Then, the first proper-frame image signal, the under-frame image signal, and the second proper-frame image signal are respectively sent to the developing units 404, 405, and 1102.

The developing unit 404 sends first proper-frame image data, which is obtained by developing the first proper-frame image signal, to a composition unit 1106, a luminance composition ratio computation unit 1103, and the luminance difference composition ratio computation unit 407. The developing unit 405 sends under-frame image data, which is obtained by developing the under-frame image signal, to the composition unit 1106 and the luminance difference composition ratio computation units 407 and 1104. Moreover, the developing unit 1102 sends second proper-frame image data, which is obtained by developing the second proper-frame image signal, to the composition unit 1106 and the luminance difference composition ratio computation unit 1104.

The luminance composition ratio computation unit 1103 computes a luminance composition ratio according to luminance with reference to the first proper frame image data. Then, the luminance composition ratio computation unit 1103 sends the luminance composition ratio concerned to the composition ratio computation unit 1105. The luminance difference composition ratio computation unit 407 computes a luminance difference composition ratio (referred to as a first luminance difference composition ratio) on the basis of the luminance difference between the first proper frame image data and the under-frame image data. Then, the luminance difference composition ratio computation unit 407 sends the first luminance difference composition ratio to the composition ratio computation unit 1105.

Moreover, the luminance difference composition ratio computation unit 1104 computes a luminance difference composition ratio (referred to as a second luminance difference composition ratio) on the basis of the luminance difference between the under-frame image data and the second proper-frame image data. Then, the luminance difference composition ratio computation unit 1104 sends the second luminance difference composition ratio to the composition ratio computation unit 1105.

The composition ratio computation unit 1105 computes a composition ratio on the basis of the luminance composition ratio, the first and second luminance difference composition ratios, and the shutter speed, and sends the composition ratio concerned to the composition unit 1106. The composition unit 1106 composites the first proper-frame image data, the second proper-frame image data, and the under-frame image data according to the composition ratio, and outputs the composited data as HDR composite image data to the signal processing unit 5 through the HDR composite image output terminal 410.

The HDR composition process in the HDR processing unit 4 of the camera according to the second embodiment will be further described hereinafter. A first proper-frame image signal is input to the first proper-frame input terminal 402 from the signal processing unit 3 by the unit of frames. Similarly, an under-frame image signal is input to the under-frame input terminal 403 from the signal processing unit 3 by the unit of frames. Similarly, a second proper-frame image signal is input to the second proper-frame input terminal 1101 from the signal processing unit 3 by the unit of frames.

Figure 12:
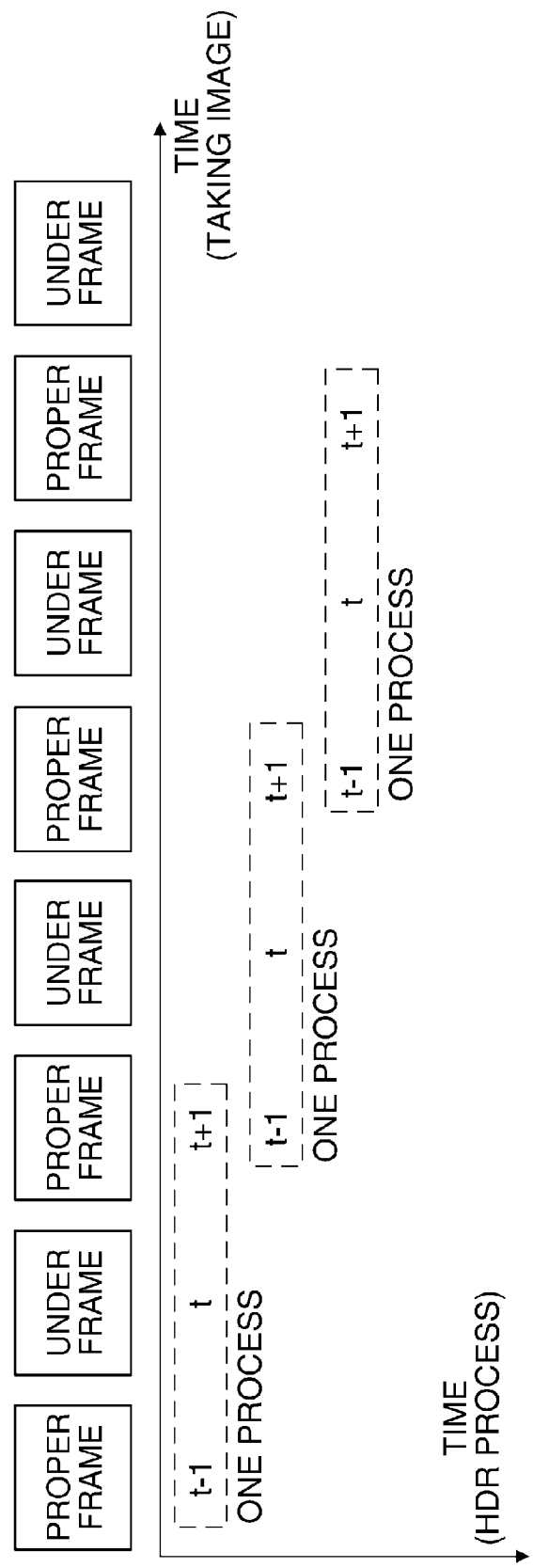
FIG. 12 is a view showing an example of a flow of image signals in the unit of frames that are input into the HDR processing unit shown in FIG. 11.

FIG. 12 is a view showing an example of a flow of image signals in the unit of frames that are input into the HDR processing unit 4 shown in FIG. 11.

In the illustrated example, the camera takes an image at a proper exposure at time (t−1), and takes an image in the state of an under exposure at time t. Furthermore, the camera takes an image at the proper exposure at time (t+1). Then, the first proper-frame image signals are sequentially input to the HDR processing unit 4 via the first proper-frame input terminal 402. On the other hand, the under-frame image signals are sequentially input to the HDR processing unit 4 via the under-frame input terminal 403. Moreover, the second proper-frame image signals are sequentially input to the HDR processing unit 4 via the second proper-frame input terminal.

One process for generating image data of one frame in the HDR composition process needs the first proper-frame image signal, the under-frame image signal, and the second proper-frame image signal. Then, the second proper-frame image signal in one process becomes the first proper-frame image signal in the following one process.

Since the processes in the developing units 404 and 405 are identical to the processes in the first embodiment, the descriptions are omitted. Moreover, since the configuration and the process of the developing unit 1102 are identical to the configuration and the process of the developing unit 404 shown in FIG. 4, the description is omitted.

As mentioned above, the luminance composition ratio computation unit 1103 computes a luminance composition ratio according to luminance of the first proper-frame image data.

Figure 13:
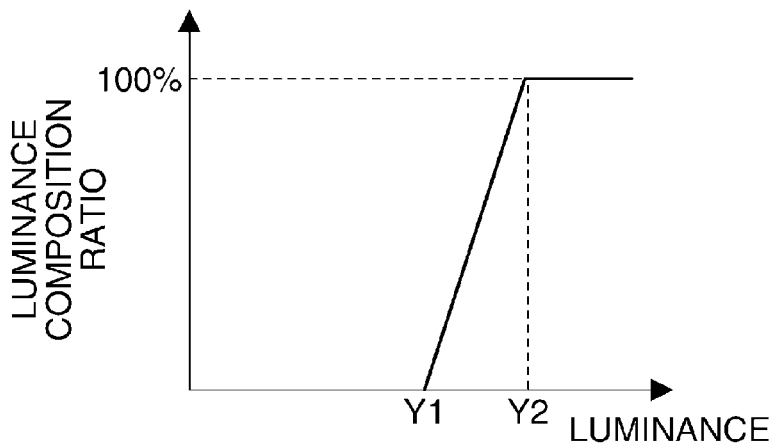
FIG. 13 is a graph showing a relationship between a luminance composition ratio of image data other than first proper-frame image data that is computed by a luminance composition ratio computation unit shown in FIG. 11 and luminance.

FIG. 13 is a graph showing a relationship between a luminance composition ratio k of image data other than the first proper-frame image data that is computed by the luminance composition ratio computation unit 1103 shown in FIG. 11 and luminance.

In order to obtain HDR composite image data, the luminance composition ratio of the first proper-frame image data becomes 100% in an area darker than a first luminance composition threshold Y1 in the first proper-frame image data, and the luminance composition ratio k of the image data other than the first proper-frame image data becomes 100% in an area brighter than a second luminance composition threshold Y2 that is larger than the first luminance composition threshold Y1. That is, when the luminance of the first proper-frame image data (first proper-frame luminance) is smaller than the first luminance composition threshold Y1, the luminance composition ratio k of the image data other than the first proper-frame image data becomes 0%.

On the other hand, when the first proper-frame luminance is larger than the second luminance composition threshold Y2, the luminance composition ratio of the image data other than first proper-frame image data will be 100%. Then, when the first proper-flame luminance is above the first luminance composition threshold Y1 and is below the second luminance composition threshold Y2, the luminance composition ratio computation unit 1103 monotonically increases (i.e., linearly increases) the luminance composition ratio k of the image data other than the first proper-frame image data from 0% to 100% to smooth the changeover between the images.

The first luminance difference composition ratio computation unit 407 computes a first luminance difference composition ratio da according to the luminance difference between the first proper-frame image data and the under-frame image data as mentioned above. Similarly, the second luminance difference composition ratio computation unit 1104 computes a second luminance difference composition ratio according to the luminance difference between the second proper-frame image data and the under-frame image data.

Since the luminance difference composition ratio is computed as described with reference to FIG. 7, the description is omitted.

The composition ratio computation unit 1105 finds a second composition ratio dc first using the following formula (3).

In a case where $da \geq db, dc = da$.

In a case where $da < db, dc = db$. (3)

That is, the composition ratio computation unit 1105 sets the second composition ratio dc to the first luminance difference composition ratio da, when the first luminance difference composition ratio da is more than the second luminance difference composition ratio db. On the other hand, the composition ratio computation unit 1105 sets the second composition ratio dc to the second luminance difference composition ratio db, when the first luminance difference composition ratio da is less than the second luminance difference composition ratio db.

Figure 14:
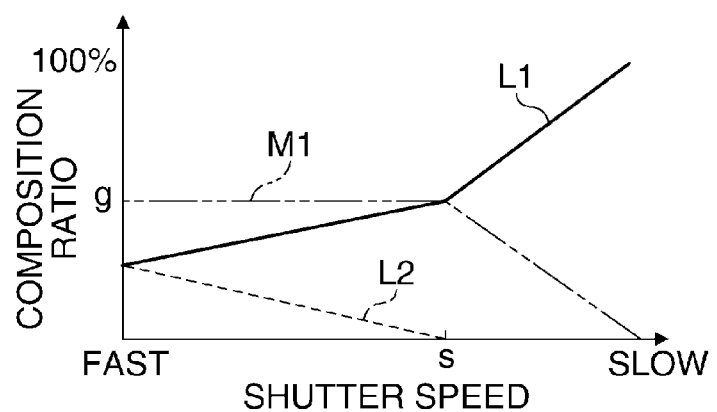
FIG. 14 is a graph showing a relationship between composition ratios that are computed by a composition ratio computation unit shown in FIG. 11 and shutter speed during the HDR composition process for a video image.

Next, the composition ratio computation unit 1105 computes the composition ratio of three frames on the basis of the shutter speed. FIG. 14 is a graph showing a relationship between the composition ratios that are computed by the composition ratio computation unit 1105 shown in FIG. 11 and the shutter speed.

The composition ratios of the first proper-frame image data, the under-frame image data, and the second proper-frame image data are respectively indicated by $gs_t$, $gs_{t-1}$, and $gs_{t+1}$. Although the minimum value of shutter speed is 1/4000 and the maximum value is 1/60, the range of shutter speed is different for each camera.

In the second embodiment, switching shutter speed s is set beforehand. When the actual shutter speed T is equal to or faster than the switching shutter speed s, three frames of image data including the under-frame image data, the first proper-frame image data, and the second proper-frame image data are composited. When the actual shutter speed T is slower than the switching shutter speed s, two frames of image data including the under-frame image data and the first proper-frame image data are composited.

When the following condition (4) is satisfied, the composition ratios $gs_t$, $gs_{t-1}$, and $gs_{t+1}$ are calculated by formulas (5). It should be noted that the highest composition ratio g of the first proper-frame image shall be 50%, and the switching shutter speed s shall be 1/300.

$$\frac{1}{4000} > T \geq s \quad (4)$$

$$gs_{t-1} = \frac{dc}{100} g\left(\frac{2000}{4000s - 1} T + \frac{1}{2}\right)$$

$$gs_{t+1} = \frac{dc}{100} g\left(\frac{1}{2} - \frac{2000g}{4000s - 1}\right) \quad (5)$$

$$gs_t = \frac{dc}{100} g$$

When the above-mentioned condition (4) is not satisfied, the composition ratio computation unit 1105 finds the variable G included in the following formulas (6) as described in the first embodiment.

Figure 15:
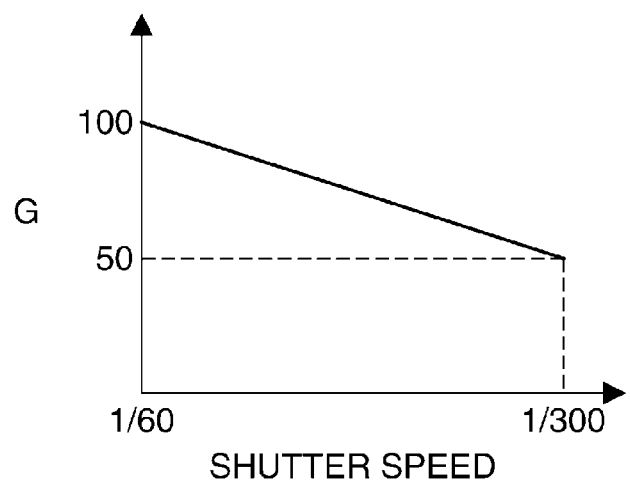
FIG. 15 is a graph showing a relationship between a variable G used by the composition ratio computation unit shown in FIG. 11 to compute the maximum composition ratio and shutter speed during the HDR composition process for a video image.

FIG. 15 is a graph showing a relationship between the variable G used by the composition ratio computation unit 1105 shown in FIG. 11 to compute the composition ratio and the shutter speed during the HDR composition process for a video image.

As shown in FIG. 15, the variable G varies in response to change of the shutter speed. In this case, the variable G increases as the shutter speed becomes slower, and the variable G decreases as the shutter speed becomes faster. Then, the variable G becomes 50 when the shutter speed is 1/300.

Next, the composition ratio computation unit 1105 finds the composition ratios $gs_t$, $gs_{t-1}$, and $gs_{t+1}$ according to the formulas (6).

$$gs_t = \frac{G}{100} \cdot dc$$

$$gs_{t+1} = 0 \quad (6)$$

$$gs_{t-1} = 100 - \frac{G}{100} \cdot dc$$

Then, the composition ratio computation unit 1105 compares the luminance composition ratio k with the composition ratio $gs_t$, and determines whether k is more than $gs_t$. When k is more than $gs_t$, the composition ratio computation unit 1105 computes the final composition ratios indicated by the following formulas (7). Here, the final composition ratios of the under-frame image data, the first proper-frame image data, and the second proper-frame image data are respectively indicated by L1, M1, and L2.

$$L1 = k$$

$$M1 = 100 - k$$

$$L2 = 0 \quad (7)$$

On the other hand, when k is equal to or smaller than $gs_t$, the composition ratio computation unit 1105 finds the composition ratios L1, M1, and L2 by the following formulas (8).

$$L1 = gs_t$$

$$M1 = gs_{t-1}$$

$$L2 = gs_{t+1} \quad (8)$$

Then, the composition ratio computation unit 1105 outputs the composition ratios L1, M1, and L2 to the composition unit 1106.

As shown in FIG. 14, the composition ratio L1 of the under-frame image data becomes larger gradually as the shutter speed becomes slower, and the increasing rate becomes large when the shutter speed becomes slower than the switching shutter speed s (=1/300). On the other hand, the composition ratio M1 of the first proper-frame image data is almost constant when the shutter speed is faster than the switching shutter speed s (=1/300), and sharply drops when the shutter speed becomes slower than the switching shutter speed. Moreover, the composition ratio L2 concerning the second proper-frame image data decreases gradually as the shutter speed becomes slower, and becomes zero when the shutter speed reaches the switching shutter speed s (=1/300).

That is, in the example shown in FIG. 14, when the shutter speed becomes slow, the number of the composite frames decreases (here, it becomes one frame). When the shutter speed becomes fast, the number of the composite frames increases (here, it becomes three frames).

The composition unit 1106 composites the under-frame image data, the first proper-frame image data, and the second proper-frame image data according to the following formula (9) with reference to the composition ratios L1, M1, and L2, and generates HDR composite image data.

$$p = p_t\left(\frac{L_1}{100}\right) + p_{t-1}\left(\frac{M_1}{100}\right) + p_{t+1}\left(\frac{L_2}{100}\right) \quad (9)$$

Wherein p, $p_t$, $p_{t-1}$, and $p_{t+1}$ respectively represent a pixel value in the final composite frame, a pixel value in the under-frame image data, a pixel value in the first proper-frame image data, and a pixel value in the second proper-frame image data.

Although the HDR composition process for a video image is described above, the HDR composition process may be applied to a still image similarly. Since a moving subject is distinctly taken in a still image when shutter speed is fast, it is necessary not to perform the composition process as much as possible in such a case.

Figure 16:
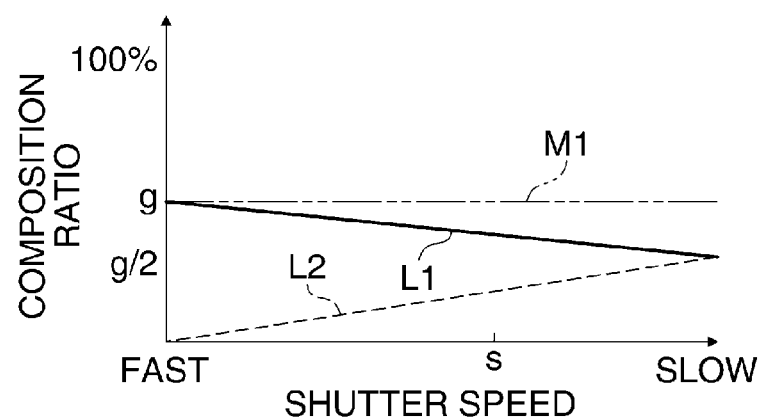
FIG. 16 is a graph showing a relationship between composition ratios that are computed by the composition ratio computation unit shown in FIG. 11 and shutter speed during the HDR composition process for a still image.

FIG. 16 is a graph showing a relationship between the composition ratios that are computed by the composition ratio computation unit 1105 shown in FIG. 11 and the shutter speed during the HDR composition process for a still image.

The composition ratio L1 of the under-frame image data drops gradually as the shutter speed becomes slower. On the other hand, the composition ratio M1 of the first proper-frame image data is almost constant irrespective of the shutter speed. Moreover, the composition ratio L2 of the second proper-frame image data increases gradually as the shutter speed becomes slower.

That is, in the example shown in FIG. 16, when the shutter speed becomes slow, the number of the composite frames increases (here, it becomes three frames). When the shutter speed becomes fast, the number of the composite frames decreases (here, it becomes two frames).

As mentioned above, since two proper frames and an under frame are composited in an area of a moving subject during the HDR composition process for image data, a sufficient HDR effect is obtained while keeping smoothness of an appearance of a video image, especially when the shutter speed is fast, in the second embodiment of the present invention.

In the second embodiment, when the HDR composition process is applied to a video image, since the number of the composite frames is changed according to the shutter speed, a sufficient HDR effect is obtained while keeping the smoothness of the appearance of the video image. That is, although two frames are composited in the first embodiment, three frames are composited in the second embodiment. Then, when the number of composite frames increases as the shutter speed becomes faster in the composition process, for example, a sufficient HDR effect is obtained while keeping the smoothness of the appearance of the video image.

Next, an image processing apparatus according to a third embodiment of the present invention will be described. In the third embodiment, a video image is obtained by applying the HDR composition process to under-frame image data and proper-frame image data that are continuously taken as with the first embodiment.

Figure 17:
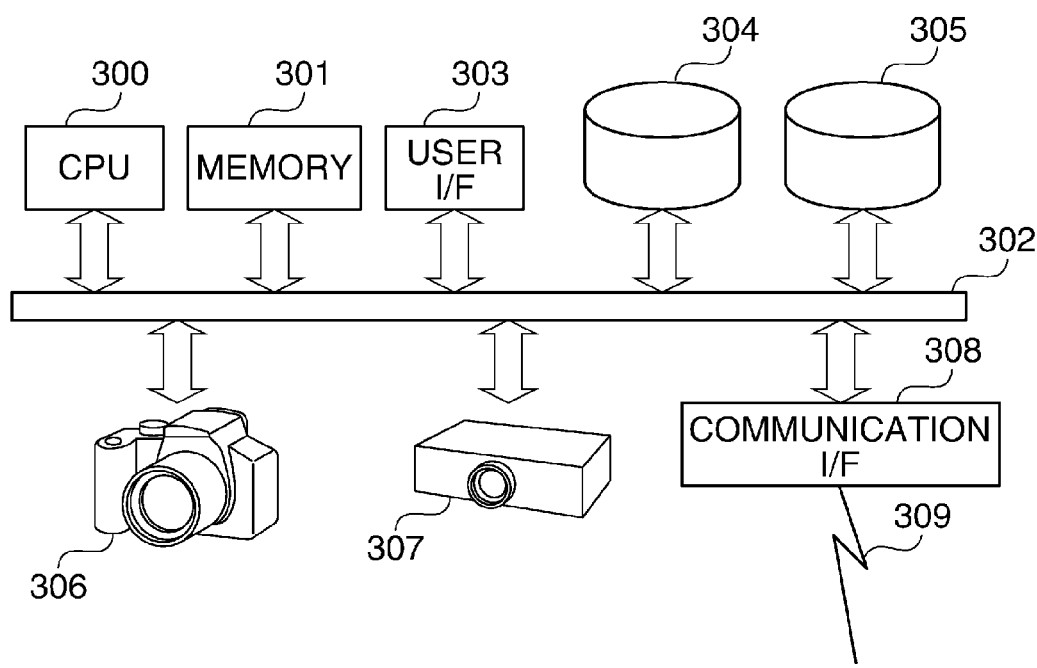
FIG. 17 is a block diagram schematically showing a configuration of an information processing apparatus as an image processing apparatus according to a third embodiment of the present invention.

FIG. 17 is a block diagram schematically showing a configuration of the image processing apparatus according to the third embodiment of the present invention.

The illustrated image processing apparatus is an information processing apparatus, such as a personal computer, for example. The information processing apparatus has a central processing unit (CPU) 300. A memory 301 has a ROM and a RAM. The ROM stores a BIOS and a boot program. The RAM is used as a work area the CPU 300. A user interface (I/F) 303 is an instruction input unit that includes a keyboard, a mouse, various switches, etc. An external storage unit 304 is a hard disk drive, for example, and provides an operating system (OS) required for control, a computer program, and a storage area required for calculation. A storage unit 305 accesses a portability storage medium (for example, a DVD-ROM or a CD-ROM) that stores video data. Then, the CPU 300, the memory 301, the user interface 303, the external storage unit 304, and the storage unit 305 are mutually connected via a bus 302.

An image pickup apparatus 306, such as a digital still camera, is connected to the bus 302 in the illustrated example. A projector 307 for displaying an image to which an image process (i.e., the HDR composition process) is applied by the information processing apparatus is further connected to the bus 302. It should be noted that the information processing apparatus is provided with a communication interface (I/F) 308. The communication I/F 308 sends and receives image data through a communication line 309, such as a LAN, a public network, or a wireless network.

When the power of the information processing apparatus is turned ON by an operation on the user interface 303, the CPU 300 loads the OS (operating system) to the memory 301 from the external storage unit 304 according to the boot program stored in the memory 301. Then, the CPU 300 loads application programs to the memory 301 from the external storage unit 304 in response to a user's instruction, and makes the information processing apparatus concerned function as an image processing apparatus.

Figure 18:
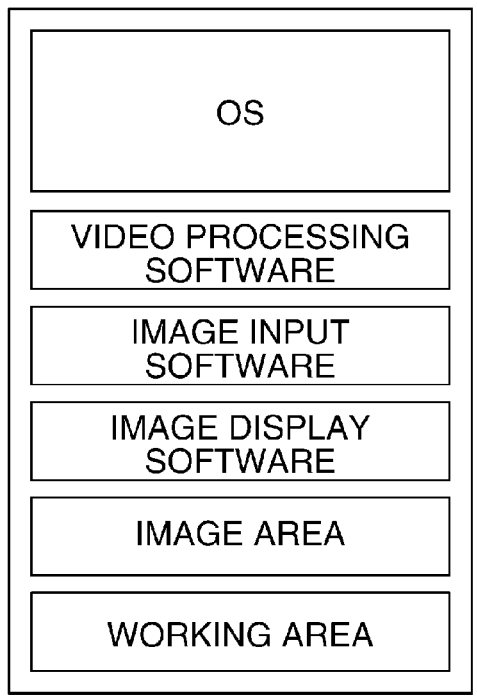
FIG. 18 is a view showing storing states of application programs loaded to a memory shown in FIG. 17.

FIG. 18 is a view showing storing states of application programs loaded to the memory 301 shown in FIG. 17.

The memory 301 stores the OS that controls the entire information processing apparatus and controls various kinds of software. Furthermore, the memory 301 stores video processing software and image input software that are application programs.

The video processing software detects a defective pixel and corrects it, for example. The image input software controls the camera 306 so as to take proper-frame image and under-frame image alternately and to input (capture) image data by the unit of frames as a video image to the information processing apparatus. It should be noted that an image area in which image data is stored and a working area in which various parameters are stored are established in the memory 301.

Figure 19:
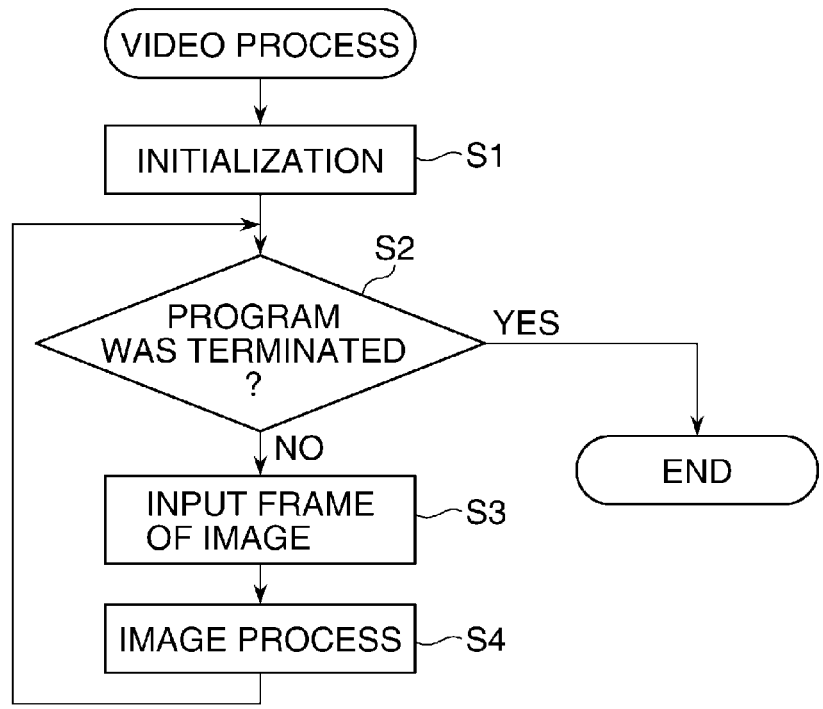
FIG. 19 is a flowchart showing a video process executed by the information processing apparatus shown in FIG. 17.

FIG. 19 is a flowchart showing a video process executed by the information processing apparatus shown in FIG. 17.

It should be noted that the CPU 300 executes the process of the flowchart in FIG. 19 by executing an application program stored in the memory 301. Moreover, the image data taken by the camera 306 shall be beforehand stored in the storage unit 305.

When the video process is started, the CPU 300 initializes the information processing apparatus (step S1). Subsequently, the CPU 300 determines whether the application program terminated (step S2). When the application program terminated (YES in the step S2), the CPU 300 finishes the video process. In the step S2, the CPU 300 determines termination of the application program according to whether a user inputted a termination instruction through the user interface 303.

When the application program does not terminate (NO in the step S2), the CPU 300 inputs image data into the image area of the memory 301 in the unit of frames from the storage unit 305 (step S3). Then, the CPU 300 performs the HDR composition process as an image process (step S4). Then, the CPU 300 returns the process to the step S2.

Figure 20:
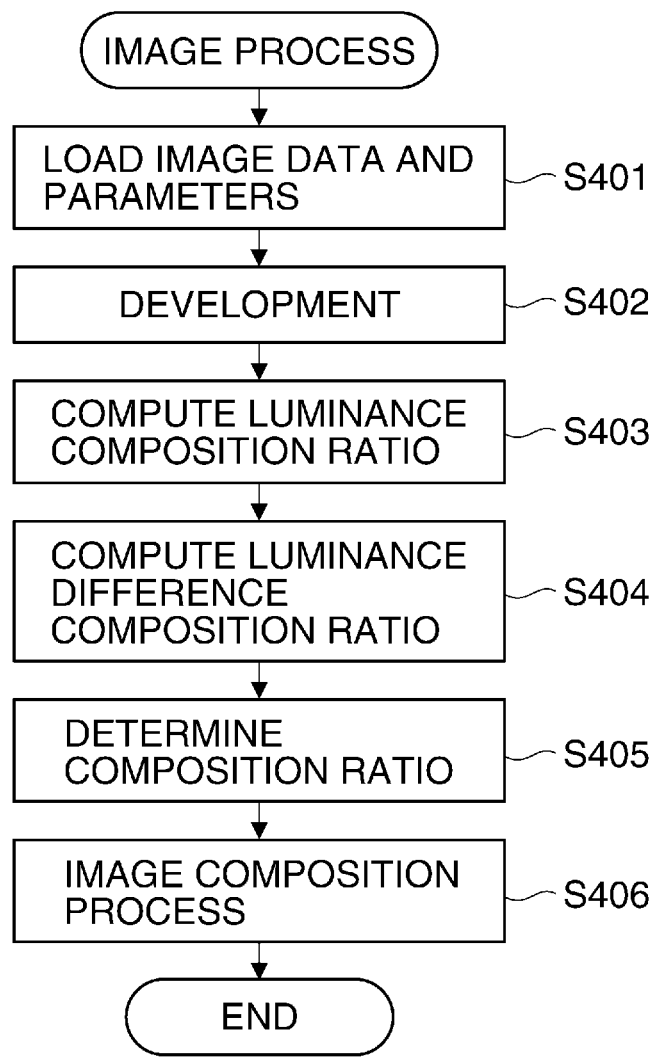
FIG. 20 is a flowchart showing an image process in step S4 in FIG. 19.

FIG. 20 is a flowchart showing the image process in the step S4 in FIG. 19.

When the image process is started, the CPU 300 loads proper-frame image data and under-frame image data continuous in time in the image data stored in the storage unit 305 onto the memory 301, and loads parameters, such as shutter speed, onto the memory 301 (step S401). Next, the CPU 300 develops the image data of two frames stored in the memory 301 so as to uniform the luminance of them (step S402).

Next, the CPU 300 computes a luminance composition ratio of the under-frame image data for every pre-divided area in an image or for every pixel with reference to the proper-frame image data (step S403). Next, the CPU 300 computes a luminance difference composition ratio of the under-frame image data on the basis of a luminance difference between the proper-frame image data and the under-frame image data for every pre-divided area in an image or for every pixel (step S404). Then, the CPU 300 selects the larger value from among the luminance composition ratio and the luminance difference composition ratio as the composition ratio of the under-frame image data (step S405).

After that, the CPU 300 applies the HDR composition process to the proper-frame image data and the under-frame image data according to the composition ratio, and stores HDR composite image data to the memory 301 (step S406). Then, the CPU 300 finishes the image process.

As mentioned above, in the third embodiment of the present invention, a sufficient HDR effect is obtained while keeping smoothness of an appearance of a video image using an information processing apparatus like a personal computer.

It should be noted that a computer program is stored in a computer readable storage medium, such as a CD-ROM, in general, and can be executed by setting the medium in a reader (a CD-ROM drive) of a computer and copying or installing it.

In the example shown in FIG. 2, the luminance composition ratio computation unit 406 functions as the first computation unit, and the luminance difference composition ratio computation unit 407 functions as the second computation unit. The composition ratio computation unit 408 functions as the third computation unit, and the composition unit 409 functions as the composition unit.

Although the embodiments of the invention have been described, the present invention is not limited to the above-mentioned embodiments, the present invention includes various modifications as long as the concept of the invention is not deviated.

For example, the functions of the above mentioned embodiments may be achieved as a control method that is executed by the image processing apparatus. Moreover, the functions of the above mentioned embodiments may be achieved as a control program that is executed by a computer with which the image processing apparatus is provided. It should be noted that the control program is recorded into a computer-readable storage medium, for example.

The above-mentioned control method and the control program at least have the first computation step, the second computation step, the third computation step, and the composing step.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-072494, filed Mar. 31, 2014, and No. 2015-056051, filed Mar. 19, 2015, which are hereby incorporated by reference herein in their entireties.

What is claimed is:

1. An image processing apparatus comprising:
    a first computation unit configured to find a first composition ratio of a plurality of frames of images that are continuously taken at mutually different exposures based on luminance of at least one of the plurality of frames of images;
    a second computation unit configured to find a second composition ratio of the plurality of frames of images based on the luminance difference between the plurality of frames of images;
    a third computation unit configured to find a third composition ratio as a final composition ratio for compositing the plurality of frames of images based on the first composition ratio, the second composition ratio, and shutter speed at a time of taking the plurality of frames of images; and
    a composition unit configured to generate one frame of an image by compositing the plurality of frames of images based on the third composition ratio.

2. The image processing apparatus according to claim 1, wherein said third computation unit compares the first composition ratio with the second composition ratio for every pre-divided area in the frames or for every pixel, and selects the larger ratio as the third composition ratio.

3. The image processing apparatus according to claim 1, wherein said third computation unit changes the second composition ratio according to the shutter speed.

4. The image processing apparatus according to claim 3, wherein said third computation unit decreases the second composition ratio as the shutter speed becomes faster in a mode for taking a video image.

5. The image processing apparatus according to claim 3, wherein said third computation unit increases the second composition ratio as the shutter speed becomes faster in a mode for taking a still image.

6. The image processing apparatus according to claim 1, wherein the plurality of frames of images include a proper-frame image taken at a proper exposure and an under-frame image taken at an under exposure that is lower than the proper exposure, and wherein said first computation unit finds the first composition ratio so that a composition ratio of the under-frame image data becomes 0% when the luminance of the proper-frame image is smaller than a first luminance composition threshold, the composition ratio of the under-frame image data becomes 100% when the luminance of the proper-frame image data is larger than a second luminance composition threshold that is larger than the first luminance composition threshold, and the composition ratio of the under-frame image data increases from 0% to 100% when the luminance of the proper-frame image data is above the first luminance composition threshold and is below the second luminance composition threshold.

7. The image processing apparatus according to claim 6, wherein said second computation unit finds the second composition ratio so that a composition ratio of the under-frame image data becomes 0% when the luminance difference is smaller than a first luminance difference composition threshold, the composition ratio of the under-frame image data becomes 100% when the luminance difference is larger than a second luminance difference composition threshold that is larger than the first luminance difference composition threshold, and the composition ratio of the under-frame image data increases from 0% to 100% when the luminance difference is above the first luminance difference composition threshold and is below the second luminance difference composition threshold.

8. The image processing apparatus according to claim 7, wherein said third computation unit changes the second composition ratio that is found by said second computation unit to obtain a changed second composition ratio, compares the changed second composition ratio with the first composition ratio for every pre-divided area in image data or for every pixel, and selects the larger ratio as the third composition ratio.

9. The image processing apparatus according to claim 1, wherein the plurality of frames of images include a first proper-frame image taken at a proper exposure, an under-frame image taken at an under exposure that is lower than the proper exposure, and a second proper-frame image taken at the proper exposure, and wherein said first computation unit finds the first composition ratio according to luminance of the first proper-frame image.

10. The image processing apparatus according to claim 9, wherein said second computation unit finds a first luminance difference composition ratio that is a composition ratio of the first proper-frame image and the under-frame image according to luminance difference between the first proper-frame image and the under-frame image, and finds a second luminance difference composition ratio that is a composition ratio of the second proper-frame image and the under-frame image according to luminance difference between the second proper-frame image and the under-frame image, and wherein said third computation unit selects the larger value from among the first luminance difference composition ratio and the second luminance difference composition ratio as the second composition ratio.

11. A control method for an image processing apparatus comprising:

a first computation step of finding a first composition ratio of a plurality of frames of images that are continuously taken at mutually different exposures based on luminance of at least one of the plurality of frames of images;

a second computation step of finding a second composition ratio of the plurality of frames of images based on the luminance difference between the plurality of frames of images;

a third computation step of finding a third composition ratio as a final composition ratio for compositing the plurality of frames of images based on the first composition ratio, the second composition ratio, and shutter speed at a time of taking the plurality of frames of images; and a composition step of generating one frame of an image by compositing the plurality of frames of images based on the third composition ratio.

12. A non-transitory computer-readable storage medium storing a control program causing a computer to execute a control method for an image processing apparatus, the control method comprising:

a first computation step of finding a first composition ratio of a plurality of frames of images that are continuously taken at mutually different exposures on luminance of at least one of the plurality of frames of images;

a second computation step of finding a second composition ratio of the plurality of frames of images based on the luminance difference between the plurality of frames of images;

a third computation step of finding a third composition ratio as a final composition ratio for compositing the plurality of frames of images based on the first composition ratio, the second composition ratio, and shutter speed at a time of taking the plurality of frames of images; and a composition step of generating one frame of an image by compositing the plurality of frames of images based on the third composition ratio.

* * * * *